Patented Dec. 26, 1944

2,365,871

UNITED STATES PATENT OFFICE 2,365,871

CONDENSATION PRODUCTS AND PROCESS FOR PREPARING THE SAME

Charles Graenacher, Riehen, and Richard Sallmann, Bottmingen, Switzerland, assignors to Society of Chemical Industry in Basle, Basel, Switzerland, a firm No Drawing. Application March 8, 1941, Serial No. 382,456. In Switzerland March 20, 1940

18 Claims. (Cl. 260—401)

It has been found that new condensation products are obtained if N-halogenmethyl derivatives of amides are allowed to react with aromatic compounds which contain at least one reactive hydrogen atom attached to the aromatic nucleus and, if desired, water solubilizing groups are introduced into the condensation products obtained.

As N-halogenmethyl derivatives of amides, use may be made, for example, of compounds derived from carboxylic acid amides, N:N'-diacylated methylenediamines, urethanes or substituted ureas which are substituted at the N-atom of at least one amido group by halogenmethyl groups or by radicals containing halogenmethyl groups, for example, their N-chloromethyl or N-bromomethyl derivatives.

The N-halogenmethyl derivatives of the amides to be used as parent materials are either known or may be obtained in the usual manner from the amides, for example, with the help of formaldehyde and of hydrohalic acids, advantageously in the presence of solvents, such as benzene.

It is particularly preferable in the present process to make use of such N-halogenmethyl derivatives of amides as are obtained by reaction of amides, particularly of carboxylic acid amides, with $\alpha:\alpha'$-dihalogendimethyl ethers, such as $\alpha:\alpha'$-dichlorodimethyl ether or $\alpha:\alpha'$-dibromodimethyl ether. When preparing such N-halogenmethyl derivatives of amides, it is preferable to allow 1.5–2 molecules of $\alpha:\alpha'$-dihalogendimethyl ether to react upon 1 molecule of amide, advantageously at a temperature of 80–100° C.

The N-halogenmethyl derivatives of carboxylic acid amides mentioned to be used as parent materials for the present process may be derived for example from aliphatic, cyclo-aliphatic, aromatic or aliphatic-aromatic carboxylic acid amides. Among such amides may be named, for example, acetic acid, chloracetic acid, butyric acid, caproic acid, lauric acid, $\alpha$-bromolauric acid, palmitic acid, and stearic acid amides; also stearic acid N-methylamide, stearic acid anilide; further benzoic acid, para-chloromethyl-benzoic acid, salicylic acid amides; finally, resinic and naphthenic acid amides. N-halogenmethyl derivatives derived from N:N'-diacylated methylenediamines which may be used are, for example, the chloromethyl derivatives obtained from N:N'-distearoylmethylenediamine with the help of paraformaldehyde and hydrochloric acid or by means of $\alpha:\alpha'$-dichlorodimethyl ether.

Among the N-halogenmethyl derivatives of urethanes and substituted ureas, mention may be made, for example, of the N-chloromethyl compounds of carbamic acid octadecyl ester or of octadecyl urea, chloromethyl derivatives which are obtainable in the usual manner.

As aromatic compounds which contain at least one reactive hydrogen atom attached to the aromatic nucleus may be mentioned, for example, hydroxy compounds and their ethers, such as alkyl ethers; also amino compounds, particularly those which contain tertiary amino groups, carboxylic acids or sulfonic acids. Among these aromatic compounds, mention may be made, for example, of compounds of the benzene and naphthalene series, such as phenol, resorcinol, anisole, dimethylaniline, $\alpha$-naphthol and $\beta$-methoxy-naphthalene. Aromatic compounds which contain a substituent of high molecular weight, such as an alkyl or acyl radical, also come into consideration. Examples of this type of parent substance are, p-hexadecyl phenol, p-hydroxyphenylheptadecyl ketone, N-methyl-N-stearoyl aniline.

Particularly valuable products are obtained according to the present invention from N-mono-substituted amides, for example from N-monoalkylamides or from N:N'-diacylated methylenediamines. The latter are formed for example by the action of $\alpha:\alpha'$-dihalogendimethylethers on primary carboxylic acid amides.

The reaction between the N-halogenmethyl derivatives of amides and the aromatic components may take place by mixing the reaction components, for example, at room temperature, preferably in the presence of a solvent, such as glacial acetic acid. By heating the mixture, for example, to 50–70° C., the speed of the reaction may be increased. In many cases, the reaction may be carried out in the presence of concentrated sulfuric acid, when, in general, sulfonated condensation products are obtained, should the aromatic component be readily sulfonatable.

If the condensation products derived from the N-halogenmethyl derivatives of amides and the aromatic compounds do not already contain water-solubilizing groups, these may be introduced by known methods of working, i. e. by effecting a water-solubilizing step.

As water solubilizing groups may be named, for example, sulfonic acid, sulfuric acid ester, thiosulfuric acid groups; also onium groups, such as quaternary ammonium groups, amino or imino groups, or radicals containing such groups, for example, radicals which are derived from thioureas, cyanamide, dicyandiamide.

The introduction of sulfonic acid or sulfuric acid ester groups may be carried out by treatment of the condensation products with sulfonating agents. The introduction of water-solubilizing groups may be particularly easily effected into those condensation products which contain a reactive substituent, for example, a reactive halogen atom. Such an atom may, for example, be converted, by treatment with alkali thiosulfates in the presence of solvents, such as methanol, acetone, into a thiosulfuric acid group. Furthermore, reactive halogen atoms may be transformed into amino groups by treatment with ammonia, primary or secondary amines. Quaternary ammonium groups may be introduced by addition of tertiary amines, such as trimethylamine, pyridine, methyl-piperidine, hexamethylenetetramine, to the condensation products containing the reactive halogen atoms or by treating condensation products containing tertiary amino groups with alkylating or aralkylating agents. The reactive halogen atoms may also be exchanged for isothiourea radicals by treatment with thioureas which can react in the iso form, preferably in the presence of solvents, such as acetone, alcohol. Among the thioureas which are capable of reacting in the iso form mention may be made of thiourea itself, allylthiourea, N-methyl-, N-ethyl-, N-hydroxyethylthioureas; radicals containing imino or amino groups, which can also introduce water-solubility in the salt form, may also be introduced by treating the condensation products containing reactive halogen atoms with cyanamide, dicyandiamide, preferably in the presence of solvents such as acetone.

The formula

wherein $r$ stands for the radical of a N-monosubstituted amide bound by the amide nitrogen atom to —CH$_2$— and $a$ stands for an aromatic radical which may contain water-solubilizing groups, may be ascribed to the condensation products obtained according to the present invention from N-halogenmethyl derivatives of N-mono-substituted amides. As an example mention is made of the product of the formula

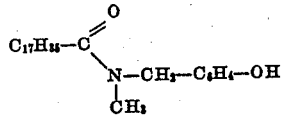

obtained from N-chloromethyl-N-methyl-stearic acid amide and phenol. In this formula the radical

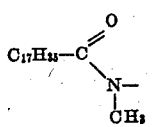

corresponds to the radical $r$ in the above formula $r$—CH$_2$—$a$. It is also possible to ascribe the following formula to the products of the present invention

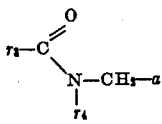

wherein $a$ has the signification indicated above, $r_3$ stands for a hydrocarbon radical which may also contain substituents or be interrupted by hetero atoms for instance for an alkyl radical, and $r_4$ stands for a substituent, for instance for an alkyl radical or for the group

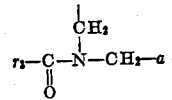

in which group $r_3$ and $a$ have the above indicated signification.

The products of the present invention obtained from primary aliphatic carboxylic acid amides having 12 to 20 carbon atoms by the action of α:α'-dihalogen-dimethylethers and subsequent reaction with aromatic compounds have the formula

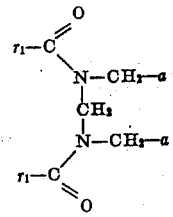

wherein $r_1$ stands for a member of the group of radicals containing an odd number of carbon atoms between 11 and 19 inclusive, and $a$ stands for an aromatic radical containing, if desired, a water-solubilizing group. In this reaction of primary carboxylic acid amides with α:α'-di-halogendimethylethers there are formed at first symmetrical methylene compounds of the formula

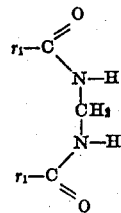

that is to say N-monosubstituted amides. By the further action of α:α'-dihalogendimethylethers on these amides there are formed N-halogenmethyl derivatives of amides, probably

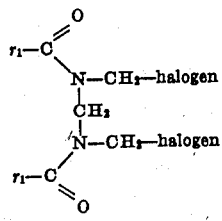

If N-halogenmethyl derivatives of the amides be caused to react with the aromatic compounds according to the present process, halogen hydride will, in all probability, be split off by union of a nuclear hydrogen atom with the halogen atom of a halogenmethyl group. According to the reactivity of the aromatic components and the molecular relationship between this component and the N-halogenmethyl derivative of an amide used, one or more substituents may be introduced into the aromatic compound.

The condensation products obtained according to the present process, so far as they are water-soluble and are prepared from suitable parent substances, may find application as textile auxiliary products, for example, as wetting-out agents, cleansing, washing, emulsifying, dispersing, foaming, softening, levelling agents. For these purposes, those condensation products are particularly adapted which contain an aliphatic or cyclo-aliphatic radical of high molecular weight. Such products, for example, those condensation products derived from N-halogen-methyl derivatives of high molecular fatty acid amides, particularly those which are cation active, are especially suitable for the purposes of softening and waterproofing.

The condensation products obtained according to the present process may be used alone or in combination with other substances, particularly with salts of weak acids, for example, sodium acetate; furthermore with soap, soap-like materials, protective colloids, finishing, weighting, softening or delustring agents and the like.

The following examples illustrate the invention, the parts, unless otherwise stated, being by weight:

Example 1

A solution of 49 parts by weight of the reaction product from stearic acid amide and α:α'-dichlorodimethylether in 140 parts by volume of glacial acetic acid is slowly added, with stirring, to a solution of 22 parts of phenol in 200 parts by volume of glacial acetic acid at 15° C. The clear solution is allowed to stand for 16 hours at room temperature, after which it is warmed for two hours to 50–60° C. A sample of the reaction mass is then soluble in warm dilute caustic soda to a clear solution. The main quantity of the glacial acetic acid is now distilled off in vacuo at 60° C. water-bath temperature. The oily residue solidifies on being introduced into water and is filtered off and washed with water. After taking it up in ether, filtering, drying with dehydrated sodium sulfate and distilling off the ether, the new product is obtained in the form of a solid, easily powdered, yellowish-colored mass, which dissolves to a clear foaming solution in warm, dilute caustic alkalis. It corresponds to the formula

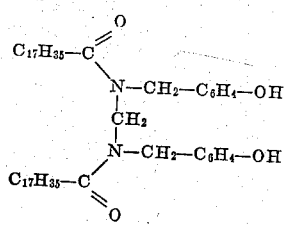

A similar product is obtained if stearic acid amide be replaced in the above example by the mixture of amides obtained from coconut oil fatty acids or by using 2-hydroxyanthracene instead of phenol.

The above reaction product from stearic acid amide and α:α'-dichlorodimethylether may be prepared according to the data given in Example 12 of applicant's U. S. patent application Ser. No. 299,388, filed Oct. 13, 1939, now Patent No. 2,338,177, issued Jan. 4, 1944.

Example 2

3.4 parts of N-chloromethyl-N-methyl-stearic acid amide, obtained by reaction of N-methyl-stearic acid amide with formaldehyde and hydrochloric acid in benzene solution, are dissolved in 10 parts by volume of glacial acetic acid. 2 parts of phenol are added, and the reaction solution is heated for 1 hour at 50° C., when a sample gives a clear solution in dilute caustic soda solution. The glacial acetic acid solution is poured into water, and the precipitated product is filtered off, dissolved in ether and the ethereal solution dried with sodium sulfate. After removal of the ether by distillation, a resinous mass of the formula

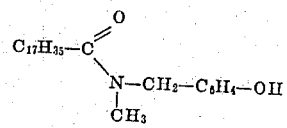

remains which gives a clear, foaming solution in dilute caustic alkali solutions.

Example 3

7 parts of the reaction product from stearic acid amide and α:α'-dichlorodimethylether, dissolved in 20 parts by volume of glacial acetic acid are added gradually, with ice cooling, to a solution of 4 parts of resorcinol in 30 parts by volume of glacial acetic acid. The reaction mixture is allowed to stand at room temperature for 16–18 hours, when small quantities of separated matter are removed by filtration and the filtrate is poured into water. The mass which separates out is filtered at the pump, washed and dried. A brownish-colored, rather resinous mass is obtained which is soluble in dilute alkalis. The product thus obtained corresponds to the formula

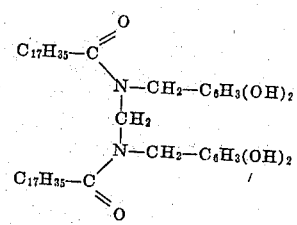

Example 4

21 parts of the reaction product from stearic acid amide and α:α'-dichlorodimethylether are melted with 6.6 parts of phenol by warming gently. The melt is introduced into 150 parts of concentrated sulfuric acid whilst stirring and cooling with ice. After stirring for 2 hours at room temperature, the reaction product is heated for 1 hour at 60–70° C., when a sample of the product is clearly soluble in dilute sodium carbonate solution. The reaction mass is poured on to ice and the sulfonic acid is extracted with butyl alcohol. The alcoholic solution is neutralized with caustic soda, and the solution of the sulfonate is evaporated to dryness in vacuo. The sodium salt of the sulfonic acid of the formula

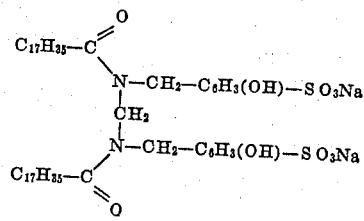

is obtained as a yellowish-colored powder which is readily soluble in water. The aqueous solution foams strongly and exhibits exceptional anion-

Example 5

7 parts of the reaction product of stearic acid amide and α:α'-dichlorodimethylether are dissolved in 40 parts of conc. sulfuric acid, and whilst stirring strongly, 3 parts of anisole are allowed to run in at 0–10° C. After stirring for 3 hours at room temperature, and heating for 2 hours at 50–60° C., a sample of the reaction mass is clearly soluble in ammonia. The mass is poured on to ice and filtered; the residue is washed with water and dissolved in alcohol. The alcoholic solution is neutralized with caustic soda solution and is evaporated to dryness. A brownish colored powder is obtained which gives a clear solution in water. The aqueous solution possesses exceptional washing and wetting-out-properties. The sulfonic acid thus obtained corresponds to the formula

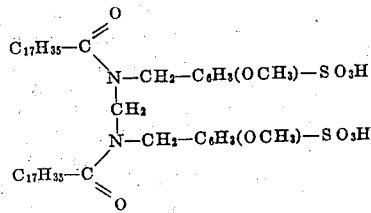

Instead of stearic acid amide there may also be used palmitic acid amide as starting material.

Example 6

12 parts of dimethylaniline in 20 parts by volume of glacial acetic acid are poured over 14 parts of the reaction product from the amides of hydrogenated whale oil fatty acids and α:α'-dichlorodimethylether and the mixture is heated. At 100–110° C. a lively exothermic reaction sets in, which is moderated by gentle cooling. When the reaction is complete, the mixture is heated for a further 5–10 minutes to the boiling point of the glacial acetic acid, when a sample of the reaction mixture is soluble in water acidified with hydrochloric acid. The reaction mixture is then poured into water and made alkaline with sodium carbonate, and the excess of dimethylaniline is removed by blowing in steam. The base is then dissolved in ether, the ethereal solution dried with anhydrous sodium sulfate and the ether distilled. A viscous oil remains which is soluble in dilute hydrochloric acid on warming.

4.5 parts of this base are heated with 2.5 parts of dimethylsulfate for 30 minutes at 110–120° C. on the oil bath. On cooling, the viscous mass solidifies to a pulverisable form. A yellow colored powder is obtained which is soluble in water to a clear solution. The product thus obtained has the formula

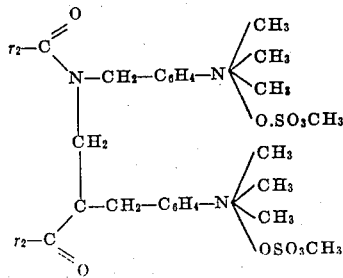

wherein $r_2$ stands for the alkyl radical of the hardened whale oil fatty acid which is united with the carboxyl group. The aqueous solution of the product described above possesses pronounced capillary active properties. The solution thus prepared exerts an excellent softening effect on viscose rayon.

What we claim is:

1. Process for the manufacture of condensation products, which comprises condensing a N-halogenmethyl derivative of a higher fatty acid amide with a member of the group consisting of compounds of the benzene and naphthalene series containing at least one reactive hydrogen atom bound to an aromatic nucleus whereby a nuclear hydrogen atom is substituted, a hydrohalic acid being split off.

2. Process for the manufacture of condensation products, which comprises condensing a N-halogenmethyl derivative of a higher fatty acid amide with a member of the group consisting of compounds of the benzene and naththalene series containing at least one reactive hydrogen atom bound to an aromatic nucleus whereby a nuclear hydrogen atom is substituted, a hydrohalic acid being split off and effecting a water-solubilizing step.

3. Process for the manufacture of condensation products, which comprises condensing a N-halogenmethyl derivative of a higher fatty acid amide containing at least 12 carbon atoms with a hydroxy compound of the benzene series containing at least one reactive hydrogen atom bound to a benzene nucleus.

4. Process for the manufacture of condensation products, which comprises condensing a N-halogenmethyl derivative of a higher fatty acid amide containing at least 12 carbon atoms with an alkoxy compound of the benzene series containing at least one reactive hydrogen atom bound to a benzene nucleus and effecting a water-solubilizing step.

5. Process for the manufacture of condensation products, which comprises condensing a N-halogenmethyl derivative of a higher fatty acid amide containing at least 12 carbon atoms with a tertiary amine of the benzene series containing at least one reactive hydrogen atom bound to a benzene nucleus whereby a nuclear hydrogen atom is substituted, a hydrohalic acid being split off and effecting a water-solubilizing step.

6. Process for the manufacture of condensation products, which comprises condensing a N-halogenmethyl derivative of a higher fatty acid amide containing at least 12 carbon atoms and corresponding to the formula

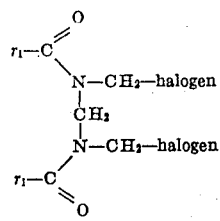

wherein $r_1$ stands for a member of the group of radicals containing an odd number of carbon atoms between 11 and 19 inclusive, containing at least one reactive hydrogen atom bound to a benzene nucleus whereby a nuclear hydrogen atom is substituted, a hydrohalic acid being split off and transforming the tertiary amino group into a quaternary ammonium group.

7. Process for the manufacture of a condensation product, which comprises condensing the N- chlormethyl derivative of stearic acid amide, corresponding to the formula

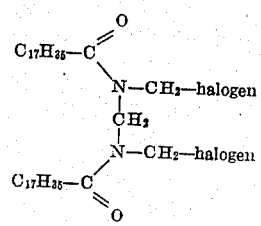

with phenol.

8. Process for the manufacture of a condensation product, which comprises condensing the N-chloromethyl derivative of stearic acid amide, corresponding to the formula

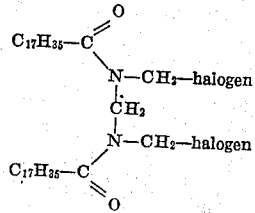

with anisol, and introducing a sulfonic acid group into the aromatic radical with the aid of a sulfonating agent.

9. Process for the manufacture of a condensation product, which comprises condensing the N-chlormethyl derivative of the amide of hardened whale oil fatty acid, corresponding to the formula

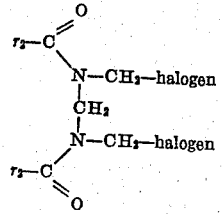

wherein $r_2$ stands for the alkyl radical of the hardened whale oil fatty acid, with dimethylaniline and transforming the tertiary amino group into a quaternary ammonium group with the aid of dimethyl sulfate.

10. Compounds of the general formula

wherein $r$ stands for the radical of a N-monosubstituted higher fatty acid amide bound by the amide nitrogen atom to —$CH_2$— and $a$ stands for a member of the group consisting of radicals of the benzene and naphthalene series, which compounds are liquid to solid substances which are decomposed by boiling with hydrochloric acid.

11. Compounds of the general formula

wherein $r$ stands for the radical of a N-monosubstituted higher fatty acid amide bound by the amide nitrogen atom to —$CH_2$— and $a$ stands for a member of the group consisting of radicals of the benzene and naphthalene series containing a water-solubilizing group, which compounds are water soluble liquid to solid substances which are decomposed by boiling with hydrochloric acid.

12. Compounds of the general formula

wherein $r$ stands for the radical of a N-monosubstituted higher fatty acid amide containing at least 12 carbon atoms bound by the amide nitrogen atom to —$CH_2$— and $a$ stands for a radical of the benzene series substituted by at least one hydroxy group, which compounds are liquid to solid substances which are decomposed by boiling with hydrochloric acid.

13. Compounds of the general formula

wherein $r$ stands for the radical of a N-monosubstituted higher fatty acid amide containing at least 12 carbon atoms bound by the amide nitrogen atom to —$CH_2$— and $a$ stands for a radical of the benzene series substituted by at least one alkoxy group and at least one water-solubilizing group, which compounds are water soluble liquid to solid substances which are decomposed by boiling with hydrochloric acid.

14. Compounds of the general formula

wherein $r$ stands for the radical of a N-monosubstituted higher fatty acid amide containing at least 12 carbon atoms bound by the amide nitrogen atom to —$CH_2$— and $a$ stands for a radical of the benzene series substituted by at least one water-solubilizing group derived from a tertiary amino group, which compounds are water soluble, liquid to solid substances, which are decomposed by boiling with hydrochloric acid.

15. Compounds of the general formula

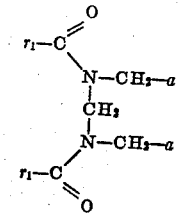

wherein $r_1$ stands for a member of the group of radicals containing an odd number of carbon atoms between 11 and 19 inclusive and $a$ stands for a radical of the benzene series containing at least one quaternary ammonium group, which compounds are water soluble liquid to solid substances which are decomposed by boiling with hydrochloric acid.

16. The compound of the formula

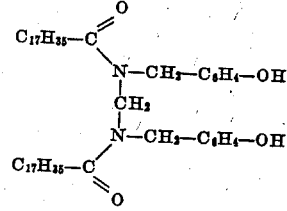

which compound is a solid substance soluble in diluted solutions of alkali hydroxides after warming to form foaming solutions, and is decomposed by boiling with hydrochloric acid.

17. The compound of the formula

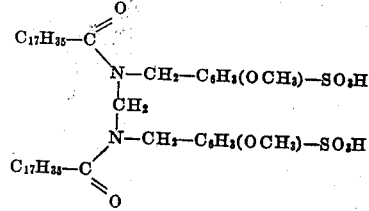

which compound is in the form of its sodium salt a solid water-soluble substance the aqueous solutions of which possess a strong wetting and washing capacity, and is decomposed by boiling with hydrochloric acid.

18. The compound of the formula

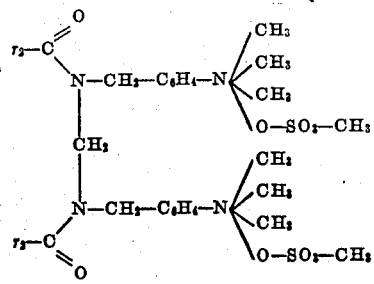

wherein $r_2$ stands for the alkyl radical of the hardened whale oil fatty acid which is united with the carboxyl group which compound is a water soluble powder the aqueous solutions of which possess a strong wetting and softening power, and is decomposed by boiling with hydrochloric acid.

CHARLES GRAENACHER.
RICHARD SALLMANN.